(12) United States Patent
Ohashi et al.

(10) Patent No.: US 12,064,831 B2
(45) Date of Patent: Aug. 20, 2024

(54) JOINING SYSTEM, AND METHOD FOR OPERATING SAME

(71) Applicant: Kawasaki Jukogyo Kabushiki Kaisha, Kobe (JP)

(72) Inventors: Ryoji Ohashi, Kobe (JP); Yoshitaka Muramatsu, Kobe (JP); Naoki Takeoka, Kobe (JP); Takuya Fukuda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 339 days.

(21) Appl. No.: 17/623,883

(22) PCT Filed: Jun. 18, 2020

(86) PCT No.: PCT/JP2020/023968
§ 371 (c)(1),
(2) Date: Dec. 30, 2021

(87) PCT Pub. No.: WO2021/002211
PCT Pub. Date: Jan. 7, 2021

(65) Prior Publication Data
US 2022/0362889 A1 Nov. 17, 2022

(30) Foreign Application Priority Data
Jul. 1, 2019 (JP) .................. 2019-123070

(51) Int. Cl.
*B23K 20/00* (2006.01)
*B23K 11/18* (2006.01)
(Continued)

(52) U.S. Cl.
CPC .............. *B23K 28/02* (2013.01); *B23K 11/18* (2013.01); *B23K 20/123* (2013.01); *B23K 20/2333* (2013.01); *B23K 37/0282* (2013.01)

(58) Field of Classification Search
CPC .............. B23K 20/123; B23K 20/1255; B23K 20/1265; B23K 2103/18; B23K 20/122;
(Continued)

(56) References Cited

U.S. PATENT DOCUMENTS

2005/0178817 A1 8/2005 Takase et al.
2019/0143442 A1 5/2019 Ohashi et al.
(Continued)

FOREIGN PATENT DOCUMENTS

JP 2005-224846 A 8/2005
JP 2006-212651 A 8/2006
(Continued)

*Primary Examiner* — Erin B Saad
(74) *Attorney, Agent, or Firm* — XSENSUS LLP

(57) ABSTRACT

A joining system (100) of the present invention is for joining a joining target (W) including first, second, and third members (W1), (W2), (W3), and includes a welder (101), a friction stir welding machine (102), and a controller (110) that: (A) causes the welder (101) to weld the second and third members (W2), (W3); (B), after (A), causes the joining target (W) to be placed at the friction stir welding machine (102) so that the first member (W1) is opposed to a distal end of a tool (10); and (C), after (B), controls a linear motion driver (7) and a rotation driver (8) so as to, while pressing the distal end of the tool (10) to the joining target (W), rotate the tool (10) around an axis, so that the softened second and third members (W2), (W3) intrude into the softened first member (W1), thus joining the joining target (W).

16 Claims, 10 Drawing Sheets

(51) Int. Cl.
*B23K 20/12* (2006.01)
*B23K 20/233* (2006.01)
*B23K 28/02* (2014.01)
*B23K 37/02* (2006.01)

(58) Field of Classification Search
CPC ...... B23K 20/125; B23K 20/12; B23K 26/22; B23K 28/02
See application file for complete search history.

(56) References Cited

U.S. PATENT DOCUMENTS

| | | | |
|---|---|---|---|
| 2019/0262934 A1* | 8/2019 | Ohashi | B23K 20/12 |
| 2019/0314927 A1* | 10/2019 | Ohashi | B23K 20/1235 |
| 2020/0016687 A1* | 1/2020 | Whalen | B23K 20/127 |
| 2021/0339337 A1* | 11/2021 | Takeoka | B23K 20/1255 |
| 2022/0362889 A1* | 11/2022 | Ohashi | B23K 26/22 |
| 2023/0390860 A1* | 12/2023 | Takeoka | B23K 20/123 |

FOREIGN PATENT DOCUMENTS

| | | |
|---|---|---|
| JP | 2007-160342 A | 6/2007 |
| JP | 2009-202828 A | 9/2009 |
| KR | 10-2014-0018482 A | 2/2014 |
| KR | 10-2018-0132154 A | 12/2018 |

\* cited by examiner

| TEST EXAMPLE 1 | TEST EXAMPLE 2 | REFERENCE EXAMPLE 1 | REFERENCE EXAMPLE 2 |
|---|---|---|---|
| 3.28kN | 3.85kN | 2.13kN | 17.90kN |

FIG.8

JOINING SYSTEM, AND METHOD FOR OPERATING SAME

CROSS-REFERENCE TO RELATED APPLICATIONS

The present application is based on PCT filing PCT/JP2020/023968, filed Jun. 18, 2020, which claims priority to JP 2019-123070, filed Jul. 1, 2019, the entire contents of each are incorporated herein by reference.

TECHNICAL FIELD

The present invention relates to a joining system and a method for operating the same.

BACKGROUND ART

There is known a method for manufacturing a vehicle body including a steel plate material and a light metal plate material having a smaller specific gravity than that of the steel plate material (see, for example, PTL 1). A vehicle body manufacturing method disclosed in PTL 1 includes a first joining step of overlaying a light metal plate material and a steel plate material on each other and causing the light metal plate material to locally soften and plastically flow by frictional heat of a rotary tool pressed from the light metal plate material side, thereby joining the light metal plate material and the steel plate material, and a second joining step of overlaying the light metal plate material and the steel plate material joined in the first joining step and two or more steel plate materials on each other, and performing joining, at positions, for these materials, by electric resistance spot welding.

CITATION LIST

Patent Literature

PTL 1: Japanese Laid-Open Patent Publication No. 2009-202828

SUMMARY OF INVENTION

Technical Problem

The present inventors have conceived of a joining system and an operation method therefor that can join three members and that are different from the above vehicle body manufacturing method disclosed in PTL 1. An object of the present invention is to provide a joining system and an operation method therefor that have novel configurations.

Solution to Problem

In order to solve the above conventional problem, a joining system according to the present invention is a joining system that joins a joining target including a first member, a second member, and a third member, the joining system including: a welder; a friction stir welding machine including a tool that is columnar and that is rotatable around an axis and movable forward/backward in a direction along the axis, a rotation driver that rotates the tool around the axis, and a linear motion driver that moves the tool forward/backward along the axis; and a controller. The first member is made of a different kind of material from the second member. The second member is made of the same kind of material as the third member. The controller executes (A) causing the welder to weld the second member and the third member to each other, (B), after the (A), causing the joining target to be placed at the friction stir welding machine so that the first member is opposed to a distal end of the tool, and (C), after the (B), controlling the linear motion driver and the rotation driver of the friction stir welding machine so as to, while pressing the distal end of the tool to the joining target, rotate the tool around the axis, so that the second member and the third member that are softened intrude into the first member that is softened, thus joining the joining target.

Thus, it is possible to sufficiently join a joining target including three members.

A joining system operation method according to the present invention is a method for operating a joining system that joins a joining target including a first member, a second member, and a third member, the joining system including a welder, and a friction stir welding machine including a tool that is columnar and that is rotatable around an axis and movable forward/backward in a direction along the axis, a rotation driver that rotates the tool around the axis, and a linear motion driver that moves the tool forward/backward along the axis. The first member is made of a different kind of material from the second member. The second member is made of the same kind of material as the third member. The method includes: (A) causing the welder to weld the second member and the third member to each other; (B), after the (A), causing the joining target to be placed at the friction stir welding machine so that the first member is opposed to a distal end of the tool; and (C) operating the linear motion driver and the rotation driver of the friction stir welding machine so as to, while pressing the distal end of the tool to the joining target, rotate the tool around the axis, so that the second member and the third member that are softened intrude into the first member that is softened, thus joining the joining target.

Thus, it is possible to sufficiently join a joining target including three members.

The above objects and other objects, features, and advantages of the present invention will become more apparent from the detailed description of the preferred embodiments below when taken in conjunction with the accompanying drawings.

Advantageous Effects of Invention

The joining system and the operation method therefor according to the present invention can sufficiently join a joining target including three members.

BRIEF DESCRIPTION OF DRAWINGS

FIG. 8 is a table showing a result of performing a tensile shear test on joining targets joined under conditions of Test Examples 1, 2 and Reference Examples 1, 2.

DESCRIPTION OF EMBODIMENTS

Hereinafter, preferred embodiments of the present invention will be described with reference to the drawings. In the following description, the same or corresponding components are denoted by the same reference signs in all the drawings and such elements are not repeatedly described. In all the drawings, components relevant to description of the present invention are selectively shown, and the other components may not be shown. The present invention is not limited to the embodiments below.

Embodiment 1

A joining system according to the present embodiment 1 is a joining system that joins a joining target including a first member, a second member, and a third member, the joining system including: a welder; a friction stir welding machine including a tool that is columnar and that is rotatable around an axis and movable forward/backward in a direction along the axis, a rotation driver that rotates the tool around the axis, and a linear motion driver that moves the tool forward/backward along the axis; and a controller. The first member is made of a different kind of material from the second member. The second member is made of the same kind of material as the third member. The controller executes (A) causing the welder to weld the second member and the third member to each other, (B), after the (A), causing the joining target to be placed at the friction stir welding machine so that the first member is opposed to a distal end of the tool, and (C), after the (B), controlling the linear motion driver and the rotation driver of the friction stir welding machine so as to, while pressing the distal end of the tool to the joining target, rotate the tool around the axis, so that the second member and the third member that are softened intrude into the first member that is softened, thus joining the joining target.

In the joining system according to the present embodiment 1, in the (C), the controller may set a position of the distal end of the tool so that at least a part of a first portion which is a portion welded in the (A) is softened.

In the joining system according to the present embodiment 1, the welder may weld the second member and the third member so that the first portion becomes larger than a diameter of the distal end of the tool as seen in a direction of the axis.

In the joining system according to the present embodiment 1, in the (C), the controller may set a position of the distal end of the tool so that the distal end of the tool is opposed to the first portion as seen in the direction of the axis.

Hereinafter, an example of the joining system according to the present embodiment 1 will be described in detail with reference to FIG. 1 to FIG. 5.

[Configuration of Joining System]

Figure 1:
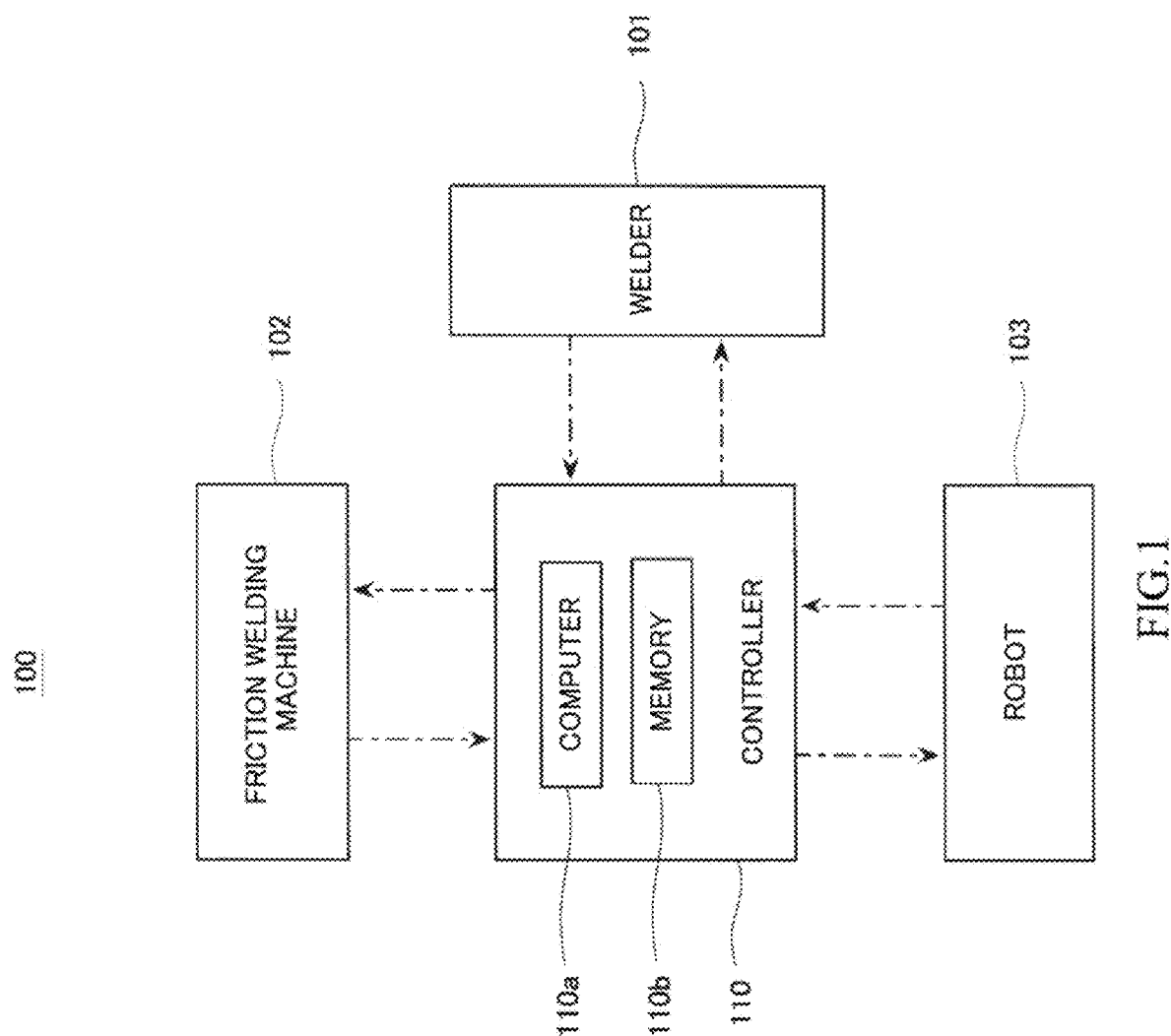
FIG. 1 is a schematic diagram showing a schematic configuration of a joining system according to embodiment 1.

FIG. 1 is a schematic diagram showing a schematic configuration of the joining system according to the present embodiment 1.

As shown in FIG. 1, a joining system 100 according to the present embodiment 1 includes a welder 101, a friction stir welding machine 102, a robot 103, and a controller 110, and is configured to join a joining target W including a first member W1, a second member W2, and a third member W3. The configurations of the welder 101 and the friction stir welding machine 102 will be described later.

The first member W1 is made of a different kind of material from the second member W2 and the third member W3, and in the present embodiment 1, is formed in a plate shape. The first member W1 may be made of a metal material (e.g., aluminum or magnesium), or fiber-reinforced plastic (e.g., carbon fiber-reinforced plastic).

The second member W2 and the third member W3 are made of the same kind of material, and in the present embodiment 1, are formed in plate shapes. The second member W2 and the third member W3 may be made of a metal material (e.g., steel (high tensile strength steel or mild steel)).

In the present embodiment 1, the case where the joining target W is formed by the first member W1, the second member W2, and the third member W3 that are plate-shaped, is shown. However, without limitation thereto, the shape of the joining target W (first member W1, second member W2, and third member W3) is optional, and may be a rectangular parallelepiped shape or an arc shape, for example.

As the robot 103, a robot of a horizontal articulated type, a vertical articulated type, or the like may be used. The robot 103 may operate the welder 101 or may operate the friction stir welding machine 102. The robot 103 may transfer and place the joining target W onto the welder 101 and/or the friction stir welding machine 102. The joining system 100 may include one robot 103 or may include robots 103.

The controller 110 includes a computer 110*a* such as a microprocessor or a CPU, and a memory 110*b* such as a ROM or a RAM. The memory 110*b* stores information such as a basic program and various fixed data. The computer 110*a* reads and executes software such as the basic program stored in the memory 110*b*, to control various operations of the welder 101, the friction stir welding machine 102, and the robot 103.

The controller 110 may be a single controller 110 that performs centralized control, or may include controllers 110 that cooperate with each other to perform distributed control. The controller 110 may be formed by a microcomputer or may be formed by a MPU, a programmable logic controller (PLC), a logic circuit, and the like.

[Configuration of Welder]

Figure 2:
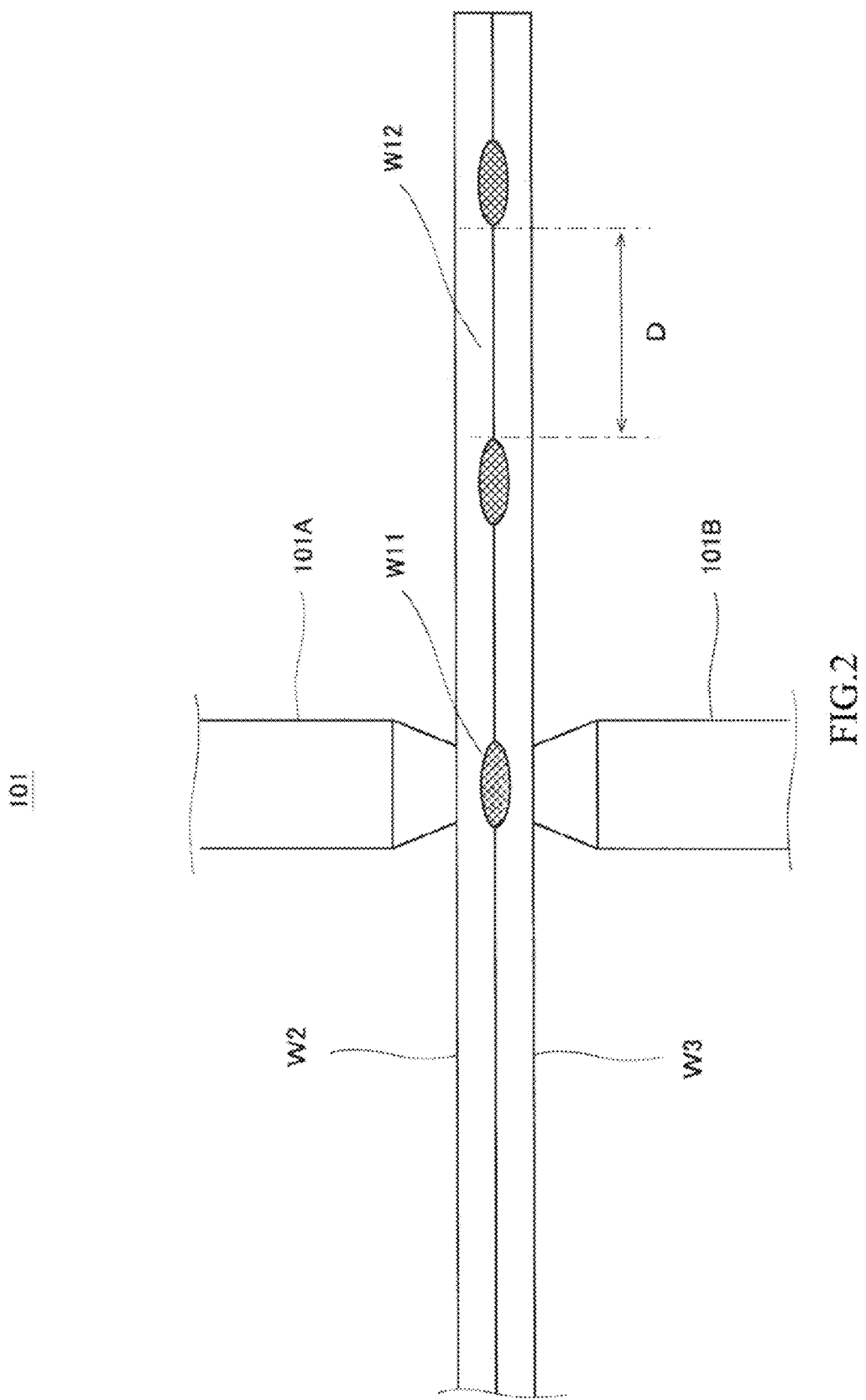
FIG. 2 is a schematic view showing an example of a welder shown in FIG. 1.

FIG. 2 is a schematic view showing an example of the welder shown in FIG. 1. In FIG. 2, some parts of the welder are not shown.

As shown in FIG. 2, the welder 101 includes a pair of welding electrodes 101A, 101B, and is configured so that a high voltage is applied between the welding electrode 101A and the welding electrode 101B.

In a state in which the welding electrode 101A and the welding electrode 101B are pressed to the second member W2 and the third member W3 contacting with each other and held therebetween, when a high voltage is applied, a current flows between these electrodes. By resistance heat generated at this time, contacting portions of the second member W2 and the third member W3 and neighboring portions thereof around are melted and joined to each other.

Hereinafter, a portion welded by the welder 101 may be referred to as first portion W11. In the second member W2 and the third member W3, a portion other than the first portion W11 may be referred to as second portion W12.

In the present embodiment 1, for the welder 101, a configuration of performing welding by electric resistance spot welding is adopted, but the welder 101 is not limited thereto. For the welder 101, a configuration of performing welding by laser welding or a configuration of performing welding by arc welding may be adopted, for example.

The diameters of the distal ends of the welding electrode 101A and the welding electrode 101B may be greater than the diameter of the distal end of a tool 10 of the friction stir welding machine 102 described later. In a case of adopting a configuration in which the welder 101 performs welding by laser welding or arc welding, the controller 110 may control the welder 101 so that the first portion W11 becomes larger than the distal end of the tool 10.

Thus, as seen in the direction of an axis X of the friction stir welding machine 102 described later, the first portion W11 welded by the welder 101 can be made larger than the size of the distal end of the tool 10.

[Configuration of Friction Stir Welding Machine]

Figure 3:
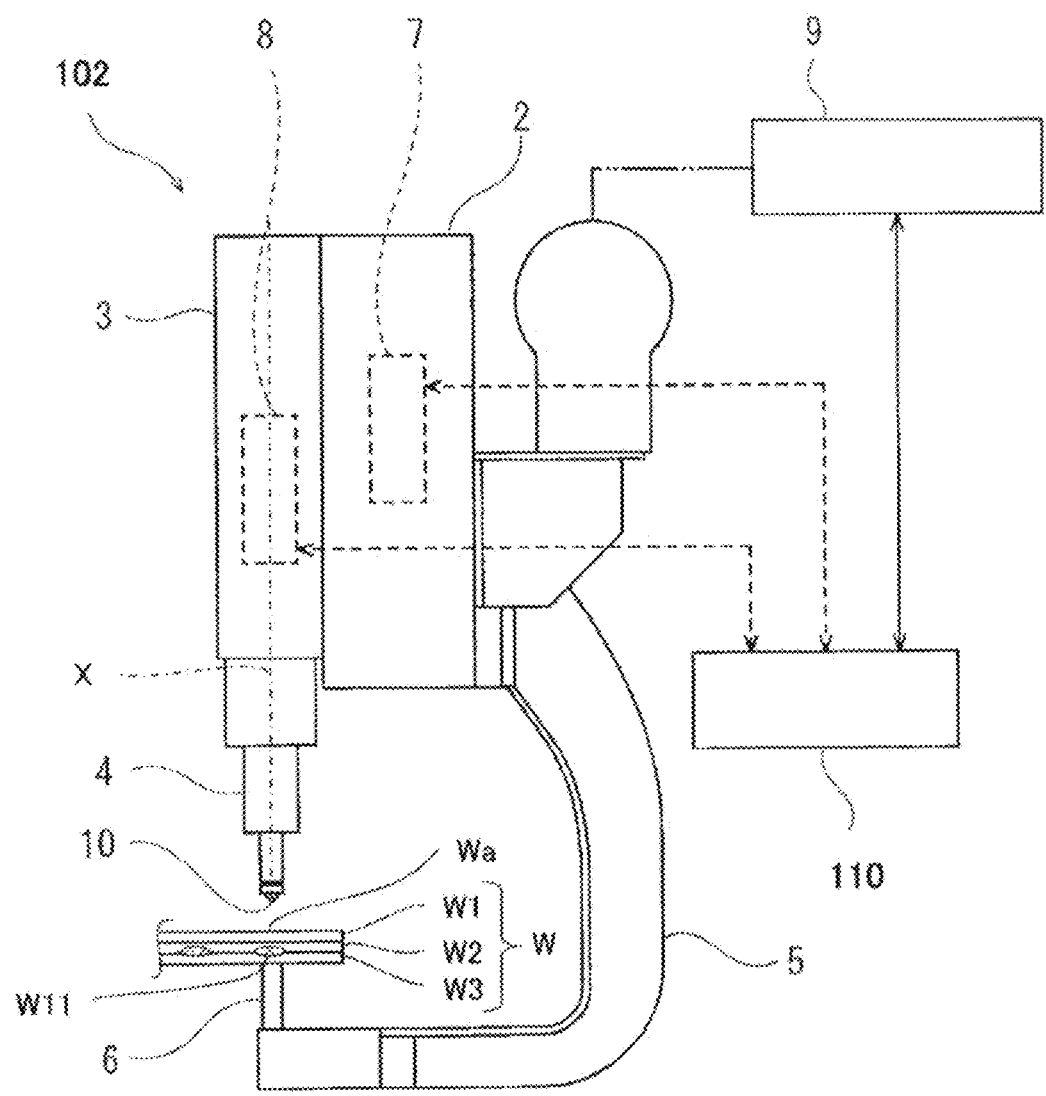
FIG. 3 is a schematic view showing a schematic configuration of a friction stir welding machine shown in FIG. 1.

FIG. 3 is a schematic view showing a schematic configuration of the friction stir welding machine shown in FIG. 1.

As shown in FIG. 3, the friction stir welding machine 102 includes the tool 10, a base 2, a movable body 3, a tool holder 4, a linear motion driver 7, a rotation driver 8, and a robot 9, and is configured to soften a spot joining portion Wa of the joining target W by frictional heat, and stir the spot joining portion Wa to cause plastic flow thereof, thereby performing friction stir welding.

The base 2 is detachably attached to a distal end of the robot 9. As the robot 9, a robot of a horizontal articulated type, a vertical articulated type, or the like can be used. The robot 9 may be the same robot as the robot 103, or may be a robot different from the robot 103.

The movable body 3 is attached to the base 2 so as to be movable in the direction of the axis X of the tool holder 4. The tool holder 4 is provided at a distal end of the movable body 3.

The tool holder 4 is rotatable around the axis X thereof, and is movable in the direction of the axis X integrally with the movable body 3. The tool 10 is detachably provided at a distal end of the tool holder 4. Attachment/detachment (replacement) of the tool 10 may be performed by a worker or a robot different from the robot 9.

The linear motion driver 7 is disposed inside the base 2. The linear motion driver 7 is configured to linearly move the movable body 3 (tool 10) in the direction of the axis X. As the linear motion driver 7, for example, an electric motor (servomotor), and a ball screw, a linear guide, or the like may be used, or a pneumatic cylinder or the like may be used.

The rotation driver 8 is disposed inside the movable body 3. The rotation driver 8 is configured to rotate the tool holder 4 and the tool 10 around the axis X. As the rotation driver 8, for example, an electric motor (servomotor) may be used.

A curved frame 5 formed substantially in a C shape (substantially in an L shape) is fixed to the base 2. The curved frame 5 has a distal end opposed to the tool 10. A support mount 6 is provided at the distal end of the curved frame 5. The support mount 6 supports the joining target W. That is, in the present embodiment 1, the base 2, the movable body 3, the tool holder 4, the curved frame 5, and the support mount 6 are formed as a C-type gun (C-type frame).

[Operation of Joining System (Operation Method for Joining System) and Effects Thereof]

Next, an operation method for the joining system 100 according to the present embodiment 1 will be described with reference to FIG. 1 to FIG. 5. The following operation is executed by the computer 110a of the controller 110 reading the program stored in the memory 110b.

Figure 4:
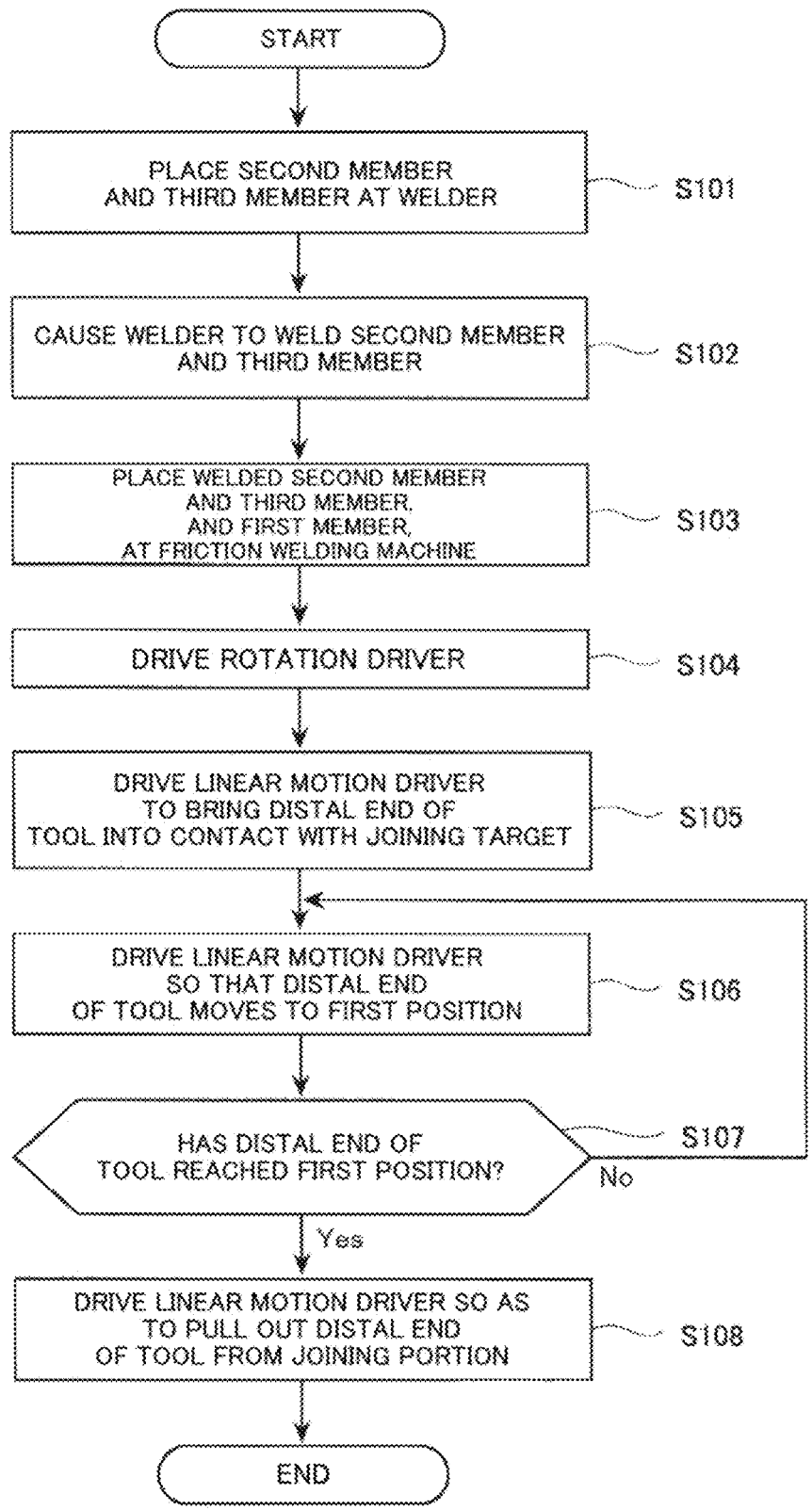
FIG. 4 is a flowchart showing an example of operation of the joining system according to embodiment 1.
Figure 5:
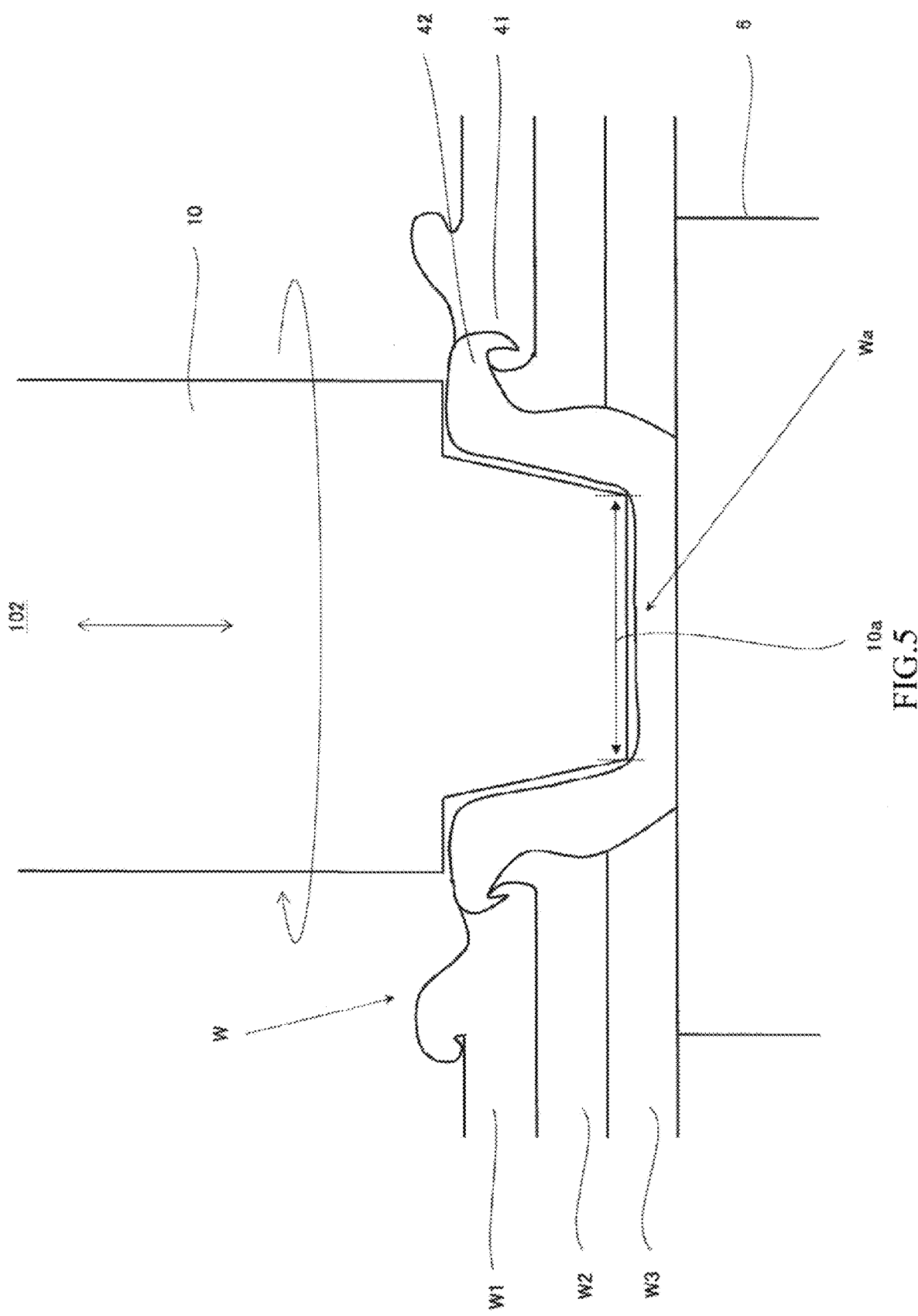
FIG. 5 is a schematic view showing a specific part of the friction stir welding machine in the joining system according to embodiment 1.

FIG. 4 is a flowchart showing an example of operation of the joining system according to the present embodiment 1. FIG. 5 is a schematic view showing a specific part of the friction stir welding machine in the joining system according to the present embodiment 1, and shows a state in which friction stir welding is performed by the tool.

First, it is assumed that the worker operates an input device (not shown) and command information indicating execution of joining of the joining target W is inputted to the controller 110. Then, as shown in FIG. 4, the controller 110 causes the robot 103 to transfer the second member W2 and the third member W3 to place them at the welder 101 (step S101). The worker may place the second member W2 and the third member W3 at the welder 101.

Next, the controller 110 causes the welder 101 to weld the second member W2 and the third member W3 to each other (step S102; see FIG. 2). At this time, the controller 110 may cause the welder 101 to perform welding, at positions, for the second member W2 and the third member W3.

Next, the controller 110 operates the robot 103 to place the second member W2 and the third member W3 welded in step S102, and the first member W1, on the support mount 6 of the friction stir welding machine 102 (step S103).

At this time, the controller 110 causes the robot 103 to place the second member W2 and the third member W3, and the first member W1 so that the first member W1 is opposed to the distal end of the tool 10 (see FIG. 3). Specifically, the second member W2 and the third member W3 welded to each other are placed on the support mount 6, and the first member W1 is placed on these members.

The controller 110 may operate the robot 103 so that a part of the distal end of the tool 10 is opposed to (overlaps) the first portion W11 as seen in the direction of the axis X, or may operate the robot 103 so that the entirety of the distal end of the tool 10 is opposed to (overlaps) the first portion W11.

The worker may place the second member W2 and the third member W3, and the first member W1, on the support mount 6 of the friction stir welding machine 102.

Next, the controller 110 drives the rotation driver 8 of the friction stir welding machine 102 to rotate the tool holder 4 and the tool 10 at a predetermined rotational speed (e.g., 50 to 6000 rpm) (step S104). Subsequently, while rotating the tool holder 4 and the tool 10, the controller 110 drives the linear motion driver 7 to bring the distal end of the tool 10 into contact with the spot joining portion Wa of the joining target W (step S105).

At this time, the controller 110 controls the linear motion driver 7 so that the tool 10 presses the joining target W with a predetermined pressing force set in advance (e.g., 4 kN to 70 kN). The predetermined rotational speed and the predetermined pressing force may be set as appropriate in advance through an experiment or the like.

Thus, the distal end of the tool 10 comes into contact with the joining portion Wa (of the first member W1) of the joining target W, and by friction between the distal end of the tool 10 and the joining portion Wa of the first member W1, frictional heat is generated, so that the joining portion Wa of the joining target W is softened and thus plastic flow thereof occurs.

Next, the controller 110 drives the linear motion driver 7 so that the distal end of the tool 10 reaches a first position (step S106). Position information of the distal end of the tool 10 is detected by a position detector (not shown) and then is outputted to the controller 110.

Here, the first position refers to a position optionally set in a range greater than 0% and smaller than 100%, where a surface of the third member W3 that contacts with the second member W2 is defined as 0% and a surface of the third member W3 that contacts with the support mount 6 is defined as 100%. From the standpoint of improving the joining strength, the first position is desired to be close to the surface of the third member W3 that contacts with the support mount 6, and may be 25% or greater, 50% or greater, 75% or greater, 80% or greater, 90% or greater, or 95% or greater.

Thus, the second member W2 and the third member W3 are also softened and plastic flow thereof occurs. Then, a second softened portion 42 which is a softened portion of the second member W2 and the third member W3 intrudes into a first softened portion 41 which is a softened portion of the first member W1, thus forming an anchor structure (see FIG. 5). As used herein, the second softened portion 42 intruding into the first softened portion 41 is referred to as anchor portion.

In addition, at least a part of the first portion W11 which is a portion welded by the welder 101 is also softened. At this time, if the temperature of the softened portion of the first portion W11 has become equal to or higher than an A1 transformation point, martensitic transformation can be caused in the second softened portion 42 when the tool 10 is pulled out. Thus, the strength of the second softened portion 42 which is the anchor portion can be increased, whereby the tensile strength of the joining target W can be improved.

Further, if the temperature of the softened portion of the first portion W11 has become equal to or higher than an A3 transformation point, the proportion of the second softened portion 42 in which martensitic transformation is caused can be increased. Thus, the strength of the second softened portion 42 which is the anchor portion can be further increased, whereby the tensile strength of the joining target W can be improved.

Next, the controller 110 determines whether or not the distal end of the tool 10 has reached the first position (step S107). Position information of the distal end of the tool 10 is detected by the position detector (not shown) and then is outputted to the controller 110.

If the controller 110 determines that the distal end of the tool 10 has not reached the first position (No in step S107), the controller 110 executes processing in step S106 and step S107 until the distal end of the tool 10 reaches the first position. On the other hand, if the controller 110 determines that the distal end of the tool 10 has reached the first position (Yes in step S107), the controller 110 executes processing in step S108.

In step S108, while rotating the tool holder 4 and the tool 10, the controller 110 drives the linear motion driver 7 so as to pull out the distal end of the tool 10 from the joining portion Wa. Then, when the distal end of the tool 10 is pulled out from the joining portion Wa, the controller 110 stops the rotation driver 8 to stop rotation of the tool holder 4 and the tool 10, and thus this program is ended. In a case where joining portions Wa are to be joined, the controller 110 may start joining of the next joining portion Wa without stopping rotation of the tool holder 4 and the tool 10.

In the joining system 100 according to the present embodiment 1 configured as described above, the controller 110 causes the welder 101 to weld the second member W2 and the third member W3 made of the same kind of material, and then causes the friction stir welding machine 102 to perform friction stir welding of the first member W1, the second member W2, and the third member W3. Thus, the joining target W can be sufficiently joined.

In addition, in the joining system 100 according to the present embodiment 1, the controller 110 operates the friction stir welding machine 102 so that at least a part of the first portion W11 welded by the welder 101 is softened.

Thus, if the temperature of the softened portion of the first portion W11 has become equal to or higher than the A1 transformation point, martensitic transformation can be caused in the second softened portion 42 when the tool 10 is pulled out. Thus, the strength of the second softened portion 42 which is the anchor portion can be increased, whereby the tensile strength of the joining target W can be improved.

Further, if the temperature of the softened portion of the first portion W11 has become equal to or higher than the A3 transformation point, the proportion of the second softened portion 42 in which martensitic transformation is caused can be increased. Thus, the strength of the second softened portion 42 which is the anchor portion can be further increased, whereby the tensile strength of the joining target W can be improved.

Embodiment 2

In a joining system according to the present embodiment 2, on the basis of the joining system according to embodiment 1, in (A), the controller causes the welder to perform welding, at positions, for the second member and the third member, and in (C), the controller causes the friction stir welding machine to join a second portion which is a portion other than first portions which are portions welded in the (A).

In the joining system according to the present embodiment 2, the second portion may be a portion between the first portions adjacent to each other, as seen in a direction of the axis.

In the joining system according to the present embodiment 2, a distance between the first portions adjacent to each other may be 15 to 40 mm.

Hereinafter, an example of the joining system according to the present embodiment 2 will be described in detail with reference to FIG. 6 and FIG. 7. The configuration of the joining system 100 according to the present embodiment 2 is basically the same as the joining system 100 according to embodiment 1, and therefore the detailed description thereof is omitted.

[Operation of Joining System and Effects Thereof]

Figure 6:
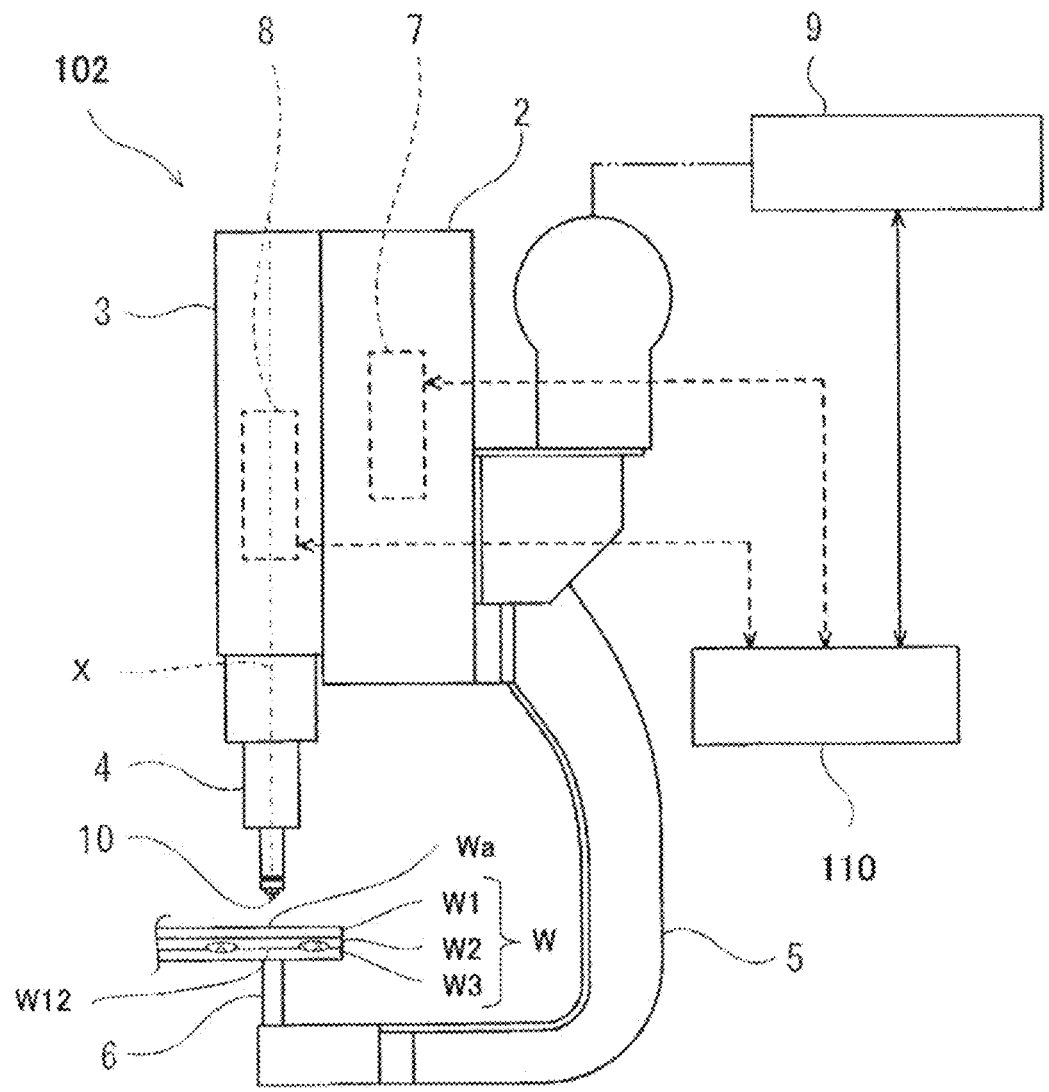
FIG. 6 is a schematic view showing a schematic configuration of a friction stir welding machine in a joining system according to embodiment 2.
Figure 7:
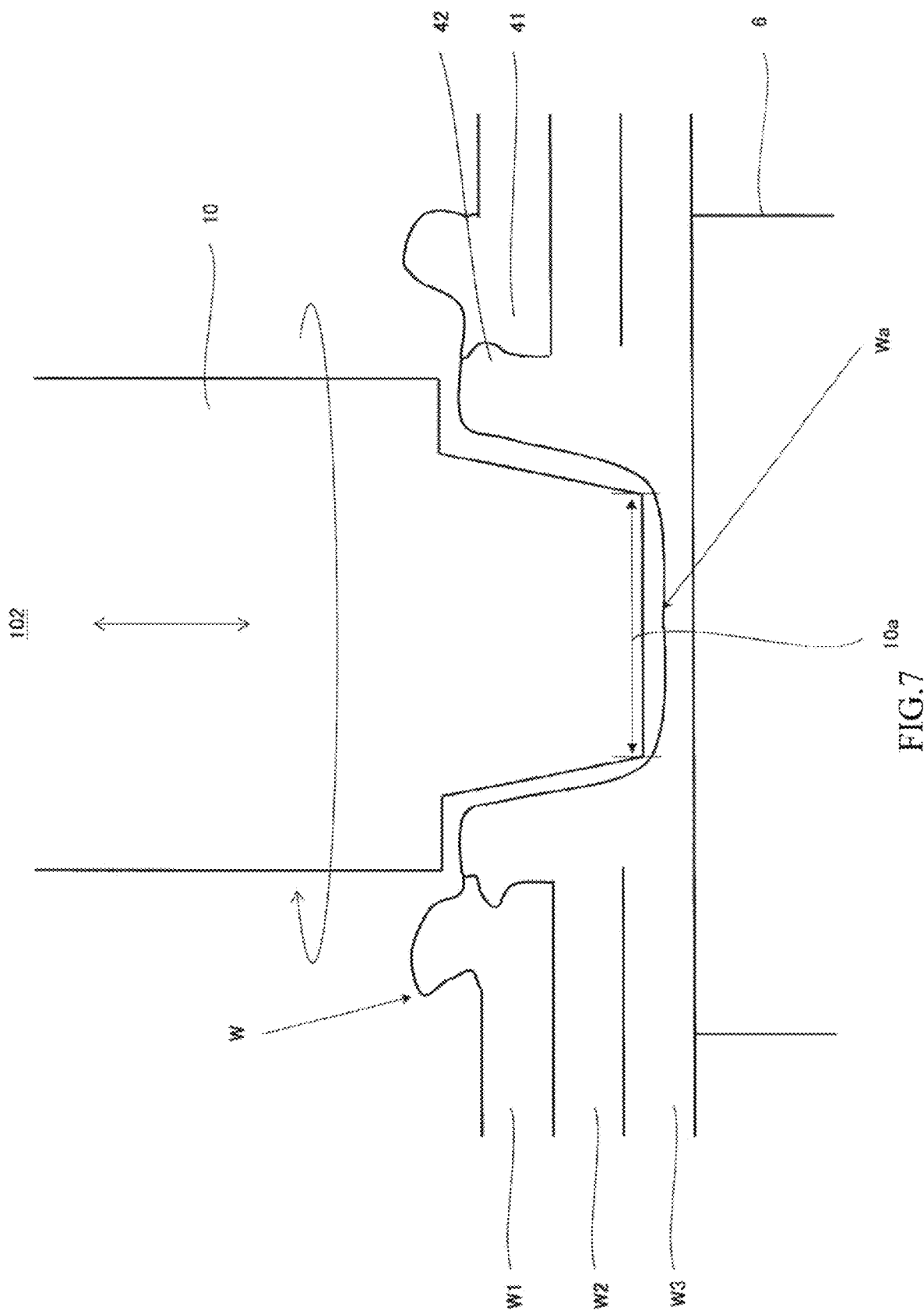
FIG. 7 is a schematic view showing a specific part of the friction stir welding machine shown in FIG. 6.

FIG. 6 is a schematic view showing a schematic configuration of a friction stir welding machine in the joining system according to the present embodiment 2. FIG. 7 is a schematic view showing a specific part of the friction stir welding machine shown in FIG. 6, and shows a state in which friction stir welding is performed by the tool.

As shown in FIG. 6, operation of the joining system 100 according to the present embodiment 2 is basically the same as operation of the joining system 100 according to embodiment 1, but the position of the joining portion Wa (joining position) is different when the friction stir welding machine 102 performs friction stir welding of the joining target W.

Specifically, in step S103 in FIG. 4, the controller 110 operates the robot 103 so that the distal end of the tool 10 is opposed to (overlaps) the second portion W12 as seen in the direction of the axis X. Here, the second portion W12 may be a portion between the first portions W11 adjacent to each other, as seen in the direction of the axis X. From the standpoint of facilitating positioning for the distal end of the tool 10, a distance D (see FIG. 2) between the adjacent first portions W11 may be 15 mm or greater, and from the standpoint of sufficiently joining the joining target W, the distance D may be 40 mm or smaller.

The joining system 100 according to the present embodiment 2 configured as described above also can sufficiently join the joining target W including the first member W1, the second member W2, and the third member W3.

TEST EXAMPLES

Next, test examples of the joining system 100 according to embodiments 1 and 2 and the vehicle body manufacturing method disclosed in PTL 1 will be described.

Test Example 1

A joining test for the joining target W was conducted using the joining system 100 according to embodiment 1. As the first member W1, an aluminum alloy plate (A6061-T6) of 1.0 mm was used, and as the second member W2 and the third member W3, a 980-MPa-grade steel plate of 1.2 mm was used.

The tool 10 in which the diameter of a distal end 10a (see FIG. 5) was 4.40 mm was used, the rotational speed of the tool 10 was set at 1500 rpm, and the pressing force of the tool 10 was set at 14.7 kN. In addition, the first position which was the reaching position of the distal end of the tool 10 was set at 2.29 mm below the top surface of the first member W1 (at 1.11 mm above the surface of the third member W3 that contacted with the support mount 6).

Test Example 2

A joining test for the joining target W was conducted using the joining system 100 according to embodiment 2. As the first member W1, an aluminum alloy plate (A6061-T6) of 1.0 mm was used, and as the second member W2 and the third member W3, a 980-MPa-grade steel plate of 1.2 mm was used.

The tool 10 in which the diameter of the distal end 10a (see FIG. 7) was 4.40 mm was used, the rotational speed of the tool 10 was set at 1500 rpm, and the pressing force of the tool 10 was set at 14.7 kN. In addition, the first position which was the reaching position of the distal end of the tool 10 was set at 2.33 mm below the top surface of the first member W1 (at 1.07 mm above the surface of the third member W3 that contacted with the support mount 6). Further, the second portion W12 where the distal end of the tool 10 was opposed to the joining target W was set at a position distant from the first portion W11 by 12 mm.

Reference Example 1

An aluminum alloy (A6061-T6) plate material of 1.0 mm and a 980-MPa-grade steel plate material of 1.2 mmn were joined by the friction spot joining machine disclosed in PTL 1. A rotary tool (tool 10) in which the diameter of the distal end was 2.35 mm was used, the rotational speed of the rotary tool was set at 2500 rpm, and the pressing force of the rotary tool was set at 2.94 kN. In addition, the first position which was the reaching position of the distal end of the rotary tool was set at 0.96 mm below the top surface of the aluminum alloy plate material.

Reference Example 2

Two 980-MPa-grade steel plates of 1.2 mm were welded by the welder 101 of the joining system 100 according to embodiment 1. Specifically, using electrodes having distal end diameters of 6 mm, welding was performed with the pressing force set at 350 kgf, for twelve cycles of current application time.

<Test Result>

Figure 9:
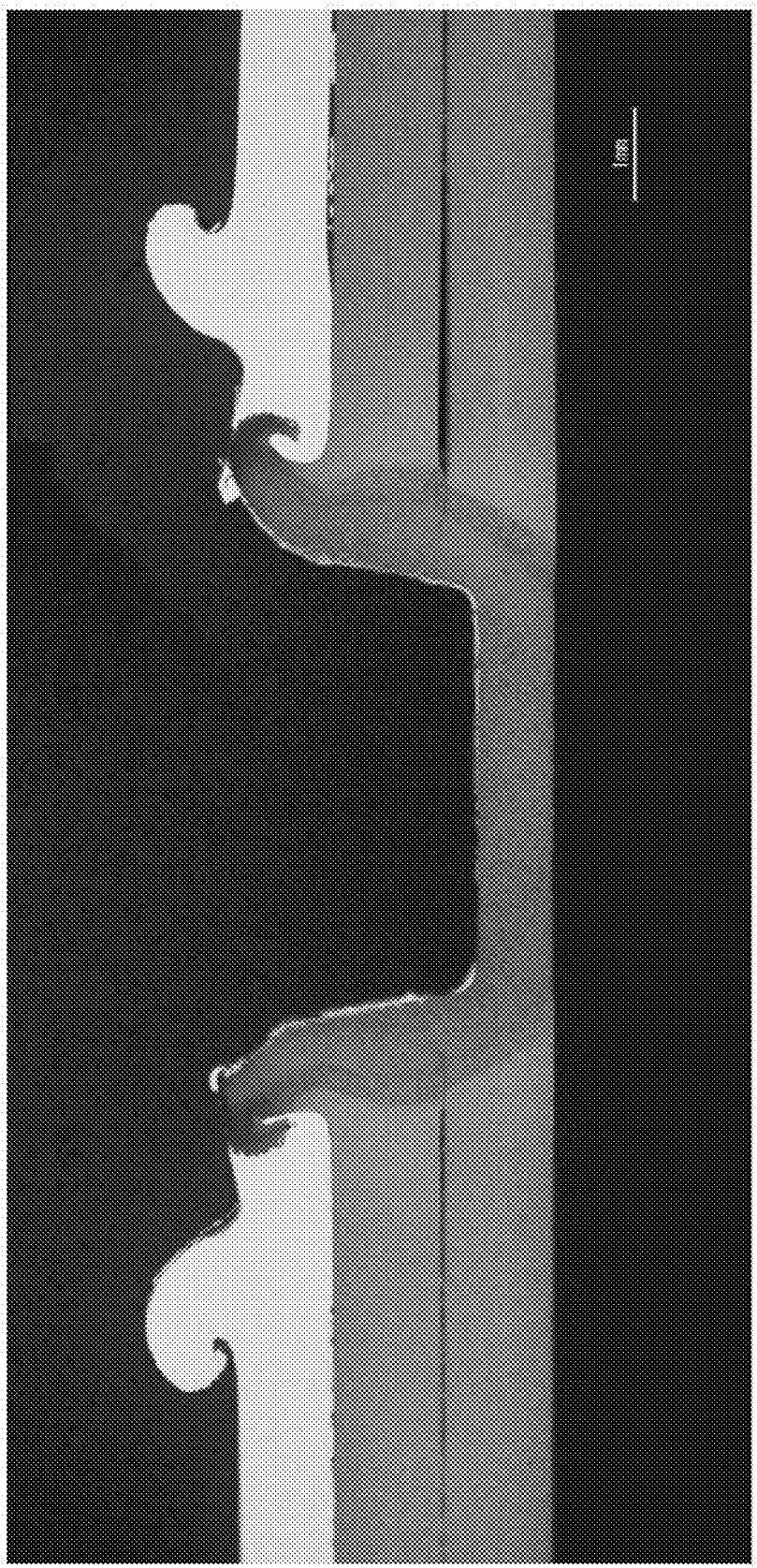
FIG. 9 is a cross-section photograph of the joining target joined under the condition of Test Example 1.
Figure 10:
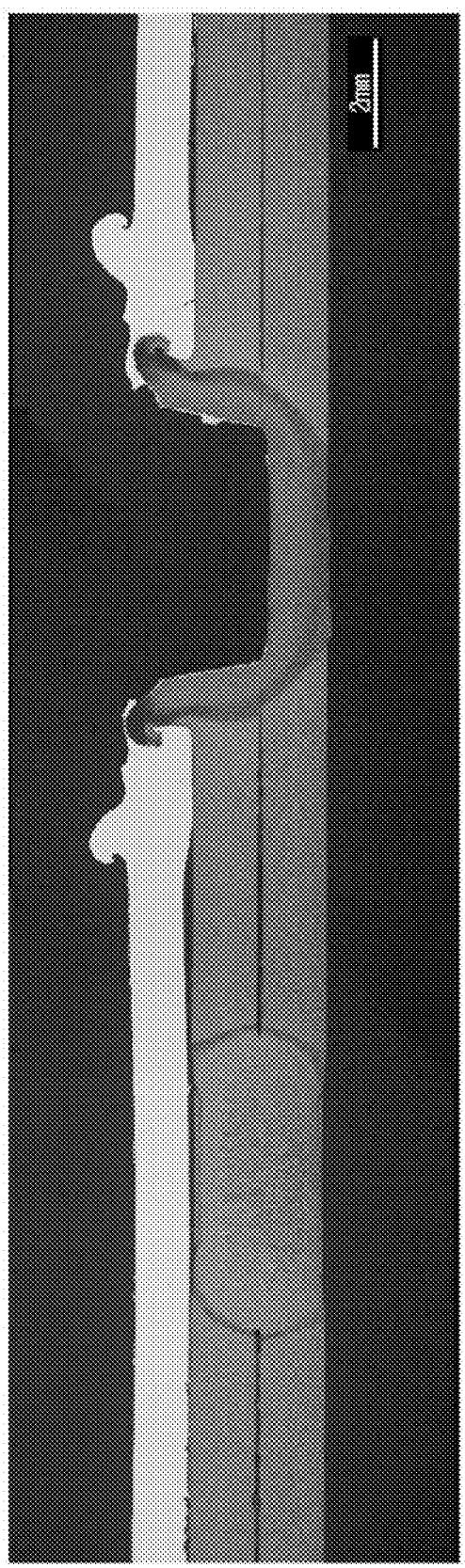
FIG. 10 is a cross-section photograph of the joining target joined under the condition of Test Example 2.

FIG. 8 is a table showing a result of performing a tensile shear test (JIS Z 3136) on the joining targets joined under the conditions of Test Examples 1, 2 and Reference Examples 1, 2. FIG. 9 is a cross-section photograph of the joining target joined under the condition of Test Example 1. FIG. 10 is a cross-section photograph of the joining target joined under the condition of Test Example 2.

As shown in FIG. 8, the tensile shear strength of the joining target joined under the condition of Reference Example 1 is smaller than the tensile shear strength of the joining target joined under the condition of Reference Example 2. Therefore, in the vehicle body manufacturing method disclosed in PTL 1, if impact or the like is given to the joining target having undergone friction stir welding during a process for manufacturing a vehicle body, separation or the like might occur at the interface between the two joined members. In addition, even after the three members are joined by spot welding, separation or the like might occur at the interface due to impact or the like, and this can lead to reduction in the joining strength of the entire product.

On the other hand, in the joining system 100 according to embodiments 1 and 2, the second member W2 and the third member W3 are strongly joined by the welder 101. Therefore, even if impact or the like is given to the joining target Win the manufacturing process, the risk of causing separation or the like can be sufficiently reduced as compared to the vehicle body manufacturing method disclosed in PTL 1.

In addition, as disclosed in FIG. 19 of PTL 1, the tensile shear strength after the three members were welded is smaller than 3.0 kN. On the other hand, as shown in FIG. 8, the tensile shear strength of the joining target W joined by the joining system 100 according to embodiments 1 and 2 is greater than 3.0 kN.

Thus, it has been shown that the joining system 100 according to embodiments 1 and 2 can obtain the joining target having a higher joining strength as compared to the vehicle body manufacturing method disclosed in PTL 1.

Further, as shown in FIG. 9 and FIG. 10, it has been shown that the joining system 100 according to embodiments 1 and 2 can sufficiently cause plastic flow of the joining target W including the first member W1, the second member W2, and the third member W3 and thus can sufficiently join the three members.

From the above description, various modifications or other embodiments of the present invention are apparent to the person skilled in the art. Therefore, the above description should be interpreted as illustrative only, and is provided for the purpose of teaching the best mode for carrying out the present invention to the person skilled in the art. The details of structures and/or the functions of the present invention may be substantially modified without deviating from the scope of the present invention.

INDUSTRIAL APPLICABILITY

The joining system and the operation method therefor according to the present invention can sufficiently join a joining target including a first member, a second member, and a third member, and thus is useful.

The invention claimed is:

1. A joining system that joins a joining target including a first member, a second member, and a third member, the joining system comprising:
  a welder;
  a friction stir welding machine including a tool that is columnar and that is rotatable around an axis and movable forward and backward in a direction along the axis, a rotation driver that rotates the tool around the axis, and a linear motion driver that moves the tool forward and backward along the axis; and
  a controller, wherein
  the first member is made of a different kind of material from the second member,
  the second member is made of the same kind of material as the third member, and
  the controller executes
    (A) causing the welder to weld the second member and the third member to each other, to form a first portion which is a welded portion,
    (B), after the (A), causing the joining target to be placed at the friction stir welding machine so that the first member is opposed to a distal end of the tool, and
    (C), after the (B), controlling the linear motion driver and the rotation driver of the friction stir welding machine so as to, while pressing the distal end of the tool to the joining target, rotate the tool around the axis, to soften the first member, the second member, and the third member, thus joining the joining target.

2. The joining system according to claim 1, wherein in the (C), the second member and the third member that are softened intrude into the first member that is softened, thus joining the joining target.

3. The joining system according to claim 1, wherein in the (C), the controller sets a position of the distal end of the tool so that at least a part of the first portion is softened.

4. The joining system according to claim 1, wherein the welder welds the second member and the third member so that the first portion becomes larger than a diameter of the distal end of the tool as seen in a direction of the axis.

5. The joining system according to claim 4, wherein in the (C), the controller sets a position of the distal end of the tool so that the distal end of the tool is opposed to the first portion as seen in the direction of the axis.

6. The joining system according to claim 1, wherein
  in the (A), the controller causes the welder to perform welding, at positions, of the second member and the third member,
  the first portion welded in (A) includes first portions welded together, and
  in the (C), the controller causes the friction stir welding machine to join a second portion which is a portion other than the first portions.

7. The joining system according to claim 6, wherein the second portion is a portion between the first portions adjacent to each other, as seen in a direction of the axis.

8. The joining system according to claim 7, wherein a distance between the first portions adjacent to each other is 15 to 40 mm.

9. A method for operating a joining system that joins a joining target including a first member, a second member, and a third member, the joining system including
  a welder, and
  a friction stir welding machine including a tool that is columnar and that is rotatable around an axis and movable forward and backward in a direction along the axis, a rotation driver that rotates the tool around the axis, and a linear motion driver that moves the tool forward and backward along the axis, wherein
  the first member is made of a different kind of material from the second member, and
  the second member is made of the same kind of material as the third member,
  the method comprising:
    (A) causing the welder to weld the second member and the third member to each other, to form a first portion which is a welded portion;
    (B), after the (A), causing the joining target to be placed at the friction stir welding machine so that the first member is opposed to a distal end of the tool; and
    (C) operating the linear motion driver and the rotation driver of the friction stir welding machine so as to, while pressing the distal end of the tool to the joining target, rotate the tool around the axis, to soften the first member, the second member, and the third member, thus joining the joining target.

10. The method for operating the joining system according to claim 9, wherein in the (C), the second member and the third member that are softened intrude into the first member that is softened, thus joining the joining target.

11. The method for operating the joining system according to claim 9, wherein in the (C), a position of the distal end of the tool is set so that at least a part of the first portion is softened.

12. The method for operating the joining system according to claim 9, wherein the welder welds the second member and the third member so that the first portion becomes larger than a diameter of the distal end of the tool as seen in a direction of the axis.

13. The method for operating the joining system according to claim 12, wherein in the (C), a position of the distal end of the tool is set so that the distal end of the tool is opposed to the first portion as seen in the direction of the axis.

14. The method for operating the joining system according to claim 9, wherein
  in the (A), the welder performs welding, at positions, of the second member and the third member,
  the first portion welded in (A) includes first portions welded together, and
  in the (C), the friction stir welding machine joins a second portion which is a portion other than the first portions.

15. The method for operating the joining system according to claim 14, wherein the second portion is a portion between the first portions adjacent to each other, as seen in a direction of the axis.

16. The method for operating the joining system according to claim 15, wherein a distance between the first portions adjacent to each other is 15 to 40 mm.

* * * * *